United States Patent [19]

Vaeth et al.

[11] 4,058,646

[45] Nov. 15, 1977

[54] MAGNETIC RECORDING MEDIA CONTAINING ELASTOMERIC POLYURETHANE BINDERS IN THE MAGNETIC COATING

[75] Inventors: Guenter Vaeth, Limburgerhof; Rudolf Bachmann, Frankenthal; Heinrich Hartmann, Limburgerhof; Hans-Joerg Hartmann, Freinsheim; Herbert Spoor, Limburgerhof; Karl Uhl, Frankenthal; August Lehner, Roedersheim-Gronau; Winfried Gutermann, Bad Duerkheim; Herbert Motz, Ludwigshafen, all of Germany

[73] Assignee: BASF Aktiengesellschaft, Ludwigshafen, Germany

[21] Appl. No.: 609,561

[22] Filed: Sept. 2, 1975

[30] Foreign Application Priority Data

Sept. 6, 1974 Germany .................... 2442762

[51] Int. Cl.$^2$ .................................. H01F 10/02
[52] U.S. Cl. .................................. 428/425; 428/900; 427/128
[58] Field of Search ............ 428/425, 900, 329; 252/62.54; 427/127, 128; 260/77.5 AP, 77.5 A

[56] References Cited

U.S. PATENT DOCUMENTS

| 3,649,541 | 3/1972 | Ingersoll et al. ............. 428/425 X |
| 3,650,828 | 3/1972 | Higashi et al. ............... 428/425 X |
| 3,922,439 | 11/1975 | Hartmann et al. ............ 428/900 X |
| 3,931,113 | 1/1976 | Seeger et al. ................. 428/425 X |

FOREIGN PATENT DOCUMENTS

| 1,147,399 | 4/1963 | Germany ...................... 427/128 |
| 1,150,887 | 5/1969 | United Kingdom ........... 427/128 |

*Primary Examiner*—Ralph S. Kendall
*Attorney, Agent, or Firm*—Keil, Thompson & Shurtleff

[57] ABSTRACT

The invention relates to magnetic recording media comprising a non-magnetic base and, applied thereto, a firmly adhering magnetic coating based on a finely divided magnetic pigment dispersed in a binder which contains at least 50 percent by weight of a special polyurethane elastomer.

This polyurethane elastomer is a thermoplastic polyurethane which is soluble in tetrahydrofuran and free from isocyanate groups, and which has been manufactured from (A) 1 mole of one or more hydroxyl-containing polyesters and/or hydroxyl-containing polyethers of molecular weight from 600 to 4,000, (B) from 3.5 to 15 moles of a branched-chain aliphatic diol of 4 to 10 carbon atoms or a mixture of aliphatic diols of 2 to 10 carbon atoms, of which at least 50 mole percent is a branched-chain aliphatic diol of 4 to 10 carbon atoms, (C) from 0 to 1 mole, but not more than 15 mole percent of the aliphatic diols according to B, of an aliphatic polyol with from 3 to 6 OH groups and 3 to 18 carbon atoms, and (D) from 4.5 to 18 moles of a diisocyanate of 6 to 30 carbon atoms, the amount of NCO groups being approximately equivalent to the amount of OH groups of the sum of the components A to C.

Magnetic recording media which contain such a polyurethane in the magnetic coating are distinguished by high surface hardness coupled with a markedly improved orientation ratio, a higher packing density and more uniform dispersion of the magnetic particles in the coating.

10 Claims, No Drawings

MAGNETIC RECORDING MEDIA CONTAINING ELASTOMERIC POLYURETHANE BINDERS IN THE MAGNETIC COATING

The present invention relates to magnetic recording media comprising a non-magnetic base and, applied thereto, a firmly adhering magnetic coating based on a finely divided magnetic pigment dispersed in a binder which contains a special polyurethane elastomer.

The increasing demands made on the quality of video and sound recordings call for further improvements in the mechanical and electromagnetic properties of magnetic recording media. As regards the mechanical properties of the magnetic coating, what is required to achieve a long life and good service characteristics is high flexibility and elasticity coupled with high tensile strength and abrasion resistance. At the same time the magnetic coating should have a very hard surface to prevent dust or other foreign bodies being easily taken up, and retained, by it. Such foreign bodies or the indentations in the coating caused thereby result in "dropouts" and fluctuations in the signal level. The properties of the magnetic coating are to a high degree influenced by the binder used for the magnetic coating. However, a particularly suitable binder or binder mixture for this application should not only give a magnetic coating with good mechanical properties but should allow the magnetic particles to be readily dispersed therein, so that high pigment loadings in the magnetic coating can be achieved, and should also allow the magnetic particles dispersed therein to attain a high degree of orientation in the direction of tape travel when the coated base is passed through a magnetic field after the coating operation.

It is known to manufacture magnetic recording media which can be subjected to severe mechanical stresses, using, as the magnetic coating, a dispersion of the magnetic pigment in a binder based on polyurethane elastomers or on mixtures of polyurethane elastomers with other polymeric binders. However, polyurethane elastomers such as those described, e.g., in German Printed Application No. 1,106,959, or polyether urethane elastomers such as are described, e.g., in U.S. Pat. No. 2,899,411, do not impart sufficient hardness to the surface of the magnetic coating when they are used as sole binder. In addition, the above types of polyurethane elastomers, when used as sole binder, have the disadvantage that magnetic particles dispersed in solutions thereof do not orient satisfactorily in the direction of tape travel when passed through a magnetic field after coating.

The patent literature contains a number of proposals for overcoming the disadvantages of insufficient coating hardness resulting from the use of polyurethanes as sole binder for the magnetic coating, by admixture of a further binder. However, the improvement in coating hardness brought about by the admixture of a polyester, as disclosed in German Printed Application No. 1,269,661, is attended by the risk of adjacent layers of tape in the pack sticking together under conditions of elevated temperature and pressure. A mixture of polyurethane elastomers and relatively high molecular weight phenoxy resins, as disclosed in German Printed Application No. 1,295,011, shows satisfactory mechanical properties up to temperatures of about 65° C, but the co-use of the phenoxy resin impairs orientation of the acicular magnetic particles in the magnetic field. The use of mixtures of vinyl chloride copolymers with polyurethane elastomers as binders for magnetic coatings has also been disclosed. For example, U.S. Pat. No. 3,144,352 discloses the addition of vinyl chloride/acrylonitrile copolymers to polyurethane elastomers, but the relatively low thermal stability of the resulting product is a disadvantage (cf. German Published Application No. 2,037,605). A combination of the polyurethane elastomers with vinyl chloride/vinyl acetate copolymers as binders for magnetic coatings is proposed in German Printed Application No. 1,282,700, but these combinations do not impart to the magnetic coating the properties it is required to exhibit in practice at elevated temperatures. Mixtures of polyester-urethanes with polycarbonates, as proposed in German Published Application No. 2,114,611, do not give solutions which are entirely satisfactory as regards their viscosity.

We have found that the surface hardness of the magnetic coating can be improved whilst at the same time achieving a marked improvement in the orientation ratio, in the packing density, in the dispersion of the magnetic particles in the magnetic coating, and in the processing properties when the magnetic coating contains, as the binder, a specific thermoplastic polyurethane as defined below.

Accordingly, the invention relates to magnetic recording media comprising a non-magnetic base and a magnetic coating firmly bonded thereto, the coating consisting essentially of a dispersion of a magnetic pigment in a binder or binder mixture containing at least 50 percent by weight of a thermoplastic polyurethane, wherein the polyurethane is a thermoplastic polyurethane which is soluble in tetrahydrofuran, is free from isocyanate groups, has high surface hardness and a high modulus of elasticity and has been manufactured from:

A. 1 mole of one or more hydroxyl-containing polyesters and/or hydroxyl-containing polyethers of molecular weight from 600 to 4,000, B. from 3.5 to 15 moles of a branched-chain aliphatic diol of 4 to 10 carbon atoms or a mixture of aliphatic diols of 2 to 10 carbon atoms, of which at least 50 mole percent is a branched-chain aliphatic diol of 4 to 10 carbon atoms, C. from 0 to 1 mole, but not more than 15 mole percent of the aliphatic diols according to B, of an aliphatic polyol with from 3 to 6 OH groups and 3 to 18 carbon atoms, and D. from 4.5 to 18 moles of a diisocyanate of 6 to 30 carbon atoms, the amount of NCO groups being approximately equivalent to the amount of OH groups of the sum of the components A to C.

Surprisingly, the polyurethanes used according to the invention as binders in the magnetic coatings are soluble in many conventional solvents, e.g. in tetrahydrofuran, dioxane, cyclohexanone or ethylglycol acetate, in spite of the large proportion of so-called hard segments which are formed, during chain lengthening, by incorporation of diol B units. The above solvents may be blended with, e.g., acetone, ethyl acetate or toluene. The hardness (according to DIN 53,157) of the polyurethanes is in general from 70 to 160 and preferably from above 80 to about 150. The hardness may be adjusted by using increasing amounts of the diols B and by the optional use of the polyols C. The polyurethanes generally have a modulus of elasticity (according to DIN 53,457) of from 300 to 2,000 N/mm² and preferably from 500 to 1,300 N/mm², a tensile strength (according to DIN 53,455) of from 55 to 95 N/mm² and an elongation at break (according to DIN 53,455) of from 250 to 750%.

Their viscosity as a 20% strength solution in tetrahydrofuran is in general from 500 to 15,000 and preferably from 1,000 to 6,000 cp. Suitable polyurethanes have softening points above 100° C and preferably from 120° to 220° C.

Advantageous hydroxyl-containing polyesters and polyethers of molecular weight from 600 to 4,000 are predominantly linear polymers with terminal OH groups, preferably with 2 OH end groups.

Suitable hydroxyl-containing polyesters are substantially linear and have molecular weights of from 600 to 4,000, preferably from 800 to 3,000, and acid numbers of less than 10, preferably less than 3. These polyesters can be manufactured in a simple manner by esterification of aliphatic dicarboxylic acids of 4 to 12 carbon atoms, preferably of 4 to 6 carbon atoms, with aliphatic glycols which may contain ether groups, preferably glycols of 2 to 12 carbon atoms, or by polymerization of cyclic lactones of 3 to 6 carbon atoms.

Examples of aliphatic dicarboxylic acids which may be used are glutaric acid, pimelic acid, suberic acid, sebacic acid, dodecanedioic acid and, preferably, adipic acid and succinic acid. The dicarboxylic acids may be used individually or as mixtures. When manufacturing the hydroxyl-containing polyesters it may be advantageous to use, in place of the dicarboxylic acids, the corresponding acid derivatives such as carboxylic acid esters of 1 to 4 carbon atoms in the alcohol radical, carboxylic acid anhydrides or carboxylic acid chlorides.

Examples of glycols which may be used are diethylene glycol, pentanediol, decanediol and 2,2,4-trimethyl-1,5-pentanediol. 1,4-butanediol, 1,6-hexanediol and 2,2-dimethyl-1,3-propanediol are preferred. Depending on the desired properties of the polyurethanes, the polyols may be employed individually or as mixtures in different amounts. Examples of cyclic lactones which may be used for the manufacture of the hydroxyl-containing polyesters are α,α-dimethyl-β-propiolactone, butyrolactone and, preferably, caprolactone.

The hydroxyl-containing polyethers are essentially linear compounds with terminal hydroxyl groups, which contain ether bonds and have molecular weights of from about 600 to 4,000, preferably from 1,000 to 2,000. Suitable hydroxyl-containing polyethers can easily be manufactured by polymerization of cyclic ethers, such as tetrahydrofuran, or by reaction of one or more alkylene oxides of 2 to 4 carbon atoms in the alkylene radical with a starter molecule which contains two active hydrogen atoms. Examples of alkylene oxides are ethylene oxide, 1,2-propylene oxide, epichlorohydrin, 1,2-butylene oxide and 2,3-butylene oxide. The alkylene oxides may be used individually, one after the other or as mixtures. Examples of starter molecules are water; glycols, e.g., ethylene glycol, propylene glycol, 1,4-butanediol and 1,6-hexanediol; amines, e.g. ethylenediamine, hexamethylenediamine and 4,4'-diaminodiphenylmethane; and aminoalcohols, e.g. ethanolamine. Like the hydroxyl-containing polyesters, the hydroxyl-containing polyethers may be used individually or as mixtures.

It is an essential characteristic of the polyurethanes used according to the invention in the magnetic coating that, in their manufacture, the chain extender used to product the hard segments consist of, or contains, a branched-chain aliphatic diol of 4 to 10 carbon atoms as component B, preferably an aliphatic diol of the formula

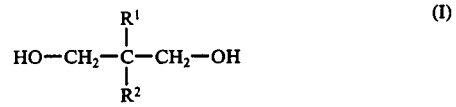

wherein $R^1$ is alkyl of 1 to 4 carbon atoms and $R^2$ is alkyl of 1 to 4 carbon atoms, which may be identical to or different from $R^1$, or is hydrogen.

Examples of diols are 2-methyl-1,3-propanediol, 2-methyl-2-ethyl-1,3-propanediol, 2-methyl-2-isopropyl-1,3-propanediol, 2,2-diethyl-1,3-propanediol, 2-methyl-2-butyl-1,3-propanediol and 2-ethyl-2-butyl-1,3-propanediol. The preferred branched-chain aliphatic diol is 2,2-dimethyl-1,3-propanediol, also known by the trivial name of neopentylglycol. By using such branched-chain aliphatic diols as chain extenders, numerous hard segments may be incorporated into the polyurethane molecule without significantly impairing the solubility of the product. The branched-chain diols may be employed as individual components or as mixtures.

In the manufacture of the polyurethanes which, according to the invention, are used as binders in the magnetic coating, the branched-chain diols used as component B may be replaced partially, in particular to the extent of up to 50 mole percent, by one or more linear glycols, i.e. aliphatic diols of 2 to 10 carbon atoms and especially glycols of the formula $HO-(CH_2)_n-OH$, wherein $n$ is from 2 to 8, i.e. the polyurethanes can also be manufactured from mixtures of branched and linear aliphatic diols as the chain extender (component B), but in every case at least 50 mole percent of component B should be a branched-chain diol.

It is furthermore possible to use, in addition, from 0 to 1 mole, preferably from 0.01 to 1 mole, of at least one aliphatic polyol with from 3 to 6 OH groups and 3 to 18 carbon atoms, and preferably an aliphatic triol, in the manufacture of the polyurethanes; the amount of such polyol or polyols should not exceed 15 mole percent, and preferably 5 mole percent, of the amount of the aliphatic diols (component B).

The hardness of the product can be modified within certain limits by the additional use of linear diols or triols. Thus, e.g., partial replacement of 2,2-dimethyl-1,3-propanediol by glycols, e.g. ethylene glycol, 1,4-butanediol or 1,6-hexanediol, results in softer polyurethanes, whilst partial replacement of branched-chain diols by triols, e.g. trimethylolethane, hexanetriol and preferably trimethylolpropane or glycerol, produces an increase in the surface hardness, as a result of crosslinking.

Suitable diisocyanates of 6 to 30 carbon atoms (component D) for the manufacture of the binders used according to the invention, which react with the hydroxyl-containing polyesters and/or polyethers (component A), the diols (component B) and, optionally, the polyols (component C) are aromatic diisocyanates and, of these, very suitable diisocyanates have the formula

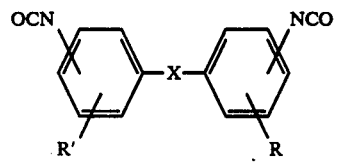

in which X is $CH_2$ or $SO_2$ and R and R' are hydrogen, chlorine or alkyl of 1 to 4 carbon atoms, and R and R' may be identical or different. Examples of aromatic diisocyanates of the above type are dichlorodiphenylmethane-diisocyanates, dimethyl-diphenylmethane-diisocyanates, 4,4'-, 4,2'- and 2,2'-diisocyanato-diphenylmethanes and the corresponding isomer mixtures and diisocyanato-diphenylsulfones. Outstanding products are obtained with 4,4'-diisocyanato-diphenylmethane, and therefore this aromatic diisocyanate is employed preferentially for the manufacture of the polyurethanes used according to the invention.

The ratio of the components A to D may be varied from about 4.5 to 18 moles of diisocyanate per mole of hydroxyl-containing polyester and/or polyether (component A) if from about 3.5 to 15 moles, and preferably from 3.5 to 10 moles, of the component B and optionally up to one mole of triol are used, the amount of the diol (component B) used depending in part on the molecular weight of the hydroxyl-containing polyester and/or polyether used. If a triol is used, it may be used in an amount up to at most one mole per mole of hydroxyl-containing polyester and/or polyether. This proportion in particular depends on the content of component B, it being possible to replace up to 15%, and preferably up to 5%, of the hydroxyl groups of the preferably branched diols (component B) by hydroxyl groups of aliphatic triols. Particularly good products are obtained if the ratio of the equivalent weights of the branched-chain diol to triol is from about 7:1 to 50:1.

In addition to the ratios already mentioned, the amount of the diisocyanate employed for the manufacture of the polyurethanes used also depends on the amount of hydroxyl-containing polyester and/or polyether, branched-chain diol and, if present, aliphatic triol. The amount of the diisocyanate should be substantially chemically equivalent to the amounts of hydroxyl-containing compounds, so that at the end of the reaction practically no free unreacted isocyanate and no free unreacted hydroxyl groups remain. However, for practical reasons it can be desirable to use a diisocyanate in up to 6% excess over the amount required for complete reaction of the reactants, so that the ratio of the number of hydroxyl groups to the number of isocyanate groups in the reaction mixture is from about 0.98:1 to 1:1.06, preferably from about 1:1.02 to 1:1.05.

To manufacture polyurethanes of the above type which exhibit very advantageous service characteristics when used as binders for magnetic recording media, preferably from 4.5 to 13.5 moles of aromatic diisocyanate, from 3.5 to 12 moles of branched-chain diol and optionally from 0.1 to 0.5 mole of triol are used per mole of hydroxyl-containing polyester and/or polyether.

Very suitable polyurethanes may be manufactured from 1 to 10 parts by weight, preferably 2.5 to 7 parts by weight, of a hydroxyl-containing polyester to polyether of molecular weight from 600 to 4,000 and preferably from 800 to 3,200, 1 part by weight of neopentyl glycol, from 0 to 0.15, and preferably from 0.01 to 0.04, part by weight of trimethylolpropane and from 3 to 4 parts by weight of diphenylmethane-diisocyanate.

The thermoplastic, elastomeric polyurethanes used according to the invention, which are soluble in ethers and/or ketones, may be manufactured in the absence of solvents. Preferably, however, they are manufactured in solution by the one-shot or prepolymer process, if appropriate in the presence of catalysts and other auxiliaries and/or additives, e.g. dibutyl-tin dilaurate or triethylenediamine.

Preferred solvents for the manufacture of the polyurethanes are cyclic ethers, e.g. tetrahydrofuran and dioxane and cyclic ketones, such as cyclohexanone. Of course, the polyurethanes can also be dissolved in other strongly polar solvents, e.g. dimethylformamide, pyrrolidone, dimethylsulfoxide or ethylene glycol acetate. Moreover, it is possible to mix the said solvents with aromatics, such as toluene or xylene, and esters, such as ethyl acetate or butyl acetate.

Examples of suitable catalysts for the manufacture of the polyurethanes are tertiary amines, e.g. triethylamine, triethylenediamine, N-methyl-pyridine and N-methyl-morpholine, metal salts, e.g. potassium acetate and zinc stearate and organic metal compounds, e.g. dibutyl-tin dilaurate. The appropriate amount of catalyst depends on the activity of the catalyst in question. In general, it has proved suitable to use from 0.005 to 0.3 part by weight, preferably from 0.01 to 0.1 part by weight, per 100 parts by weight of aromatic diisocyanate.

Details of the manufacture of the thermoplastic and elastomeric polyurethanes, soluble in ethers and/or ketones, which are used, according to the invention, as binders in magnetic coatings, are as follows:

In the one-shot process, the starting components are dissolved in a portion of the solvent, so that solutions having a solids content of from 30 to 50 percent by weight are formed. The solutions are then heated to from 20° to 90° C, preferably from 30° to 70° C, whilst stirring. In the course of the reaction, the polyurethane solutions which become more viscous are diluted stepwise to the desired final concentration and reacted at this concentration until the desired final viscosity is reached. The polyaddition reaction is stopped by adding monoalcohols, such as methanol, ethanol, sec. propanol, or sec. butanol or secondary amines, such as dimethylamine, ethylpropylamine, dibutylamine and the like. In the prepolymer process, the polyisocyanate (component D), the hydroxyl-containing polyester and/or polyether (component A) and, if required, the catalyst and the assistants and additives are reacted in a portion of the solvent at from 20° to 90° C, preferably from 30° to 70° C, to give prepolymers containing isocyanate groups. After a reaction time of from about 0.5 to 2 hours, the diol, i.e. component B, and, optionally, the triol, i.e. component C, are incorporated into the reaction mixture in the course of from 0.5 to 3 hours. Thereafter the reaction takes place as described for the one-shot process. The polyurethane solutions obtained in this way have solids contents of from 5 to 50 percent by weight, preferably 10 to 30 percent by weight.

The K value, determined by the method of H. Fikentscher (Cellulose-Chemie, 30, 58 et seq. (1932)) of suitable polyurethane products is from 55 to 75 and preferably from 60 to 70.

The further processing of the solution of the polyurethane elastomeric binder with the magnetic pigment and auxiliaries, to give magnetic recording media, may be carried out by conventional methods.

Conventional magnetic pigments can be used and these of course are also one of the factors determining the properties of the resulting magnetic coatings. Examples of suitable magnetic pigments are gamma-iron(III) oxide, finely divided magnetite, ferromagnetic, unmodified or modified chromium dioxide, cobalt-modified gamma-iron (III) oxide and ferromagnetic metals and metal alloy pigments, e.g. alloys of iron and cobalt (manufactured, for example, according to the instructions of German Pat. No. 1,247,026). Preferred magnetic pigments are acicular gamma-iron(III) oxide and ferromagnetic chromium dioxide. The particle size is in general from 0.2 to 2µ, the range from 0.3 to 0.8µ being preferred.

The magnetic coatings may also have added to them in a conventional manner small amounts of additives such as dispersing agents, lubricants and fillers during dispersion of the magnetic pigments or prior to application of the magnetic coating. Examples of such additives are fatty acids or isomerized fatty acids, e.g. stearic acid, or their salts with metals of main groups I to IV of the periodic table, amphoteric electrolytes, such as lecithin, fatty acid esters or waxes, silicone oils, carbon black and the like. The additives are used in the conventional amounts, generally less than 10 percent by weight, based on the magnetic coating, being added.

Surprisingly, the polyurethanes according to the invention can also be used as sole binder for the manufacture of magnetic coatings, i.e. it is not necessary to add further (mostly harder) binders to the mixture. However, when the magnetic recording media of the invention are to be used for special applications, the admixture of a second, substantially compatible binder for the production of magnetic coatings, in amounts of from 10 to 50 parts by weight, preferably from 20 to 40 parts by weight, based on the resulting total amount of binder, may offer further advantages. Suitable second binders are, in particular, vinyl chloride polymers which are substantially compatible with the polyurethane binder, phenoxy resins, preferably polycondensates manufactured from epichlorohydrin and bisphenol A, and polyvinylformal binders.

The weight ratio of magnetic pigment to binder or binder mixture in the recording media of the invention is in general from 1 to 10:1 and in particular from 4 to 6:1. A particular advantage of the mixture according to the invention is that, because of the excellent pigment-binding power of the polyurethanes, high loadings of magnetic pigment are possible in the magnetic coatings without their mechanical properties being impaired and their service characteristics suffering appreciably.

Conventional rigid or flexible base materials can be used as non-magnetic and non-magnetizable bases. Particularly suitable flexible bases are films of linear polyesters, such as polyethylene terephthalate, generally having a thickness of from 4 to 200 µ, particularly from 10 to 36 µ. Aluminum or aluminum alloy discs may for example be used as rigid non-magnetizable bases. More recently, the use of magnetic coatings on paper bases has become important for electronic computing and accounting machines; the coating materials according to the invention can be used with advantage for this purpose, too.

Production of the magnetic recording media of the invention may be carried out in a conventional manner. The magnetic dispersion prepared from the magnetic pigment and the solution of the binder or binders in the presence of dispersing agents and other additives in dispersing apparatus, e.g. a tube mill or a stirred ball mill, is advantageously filtered and applied to the non-magnetizable base using conventional coating equipment, e.g. a knife coater. Usually, orientation of the magnetic particles is effected before the fluid mix has dried on the base, drying being advantageously carried out for from 2 to 5 minutes at temperatures of from 50° to 90° C.

The abrasion resistance of the magnetic coatings manufactured according to the invention can be improved even further and their thermoplasticity can be reduced by adding a further polyisocyanate, preferably a diisocyanate or triisocyanate, such as 4,4'-diisocyanato-diphenylmethane, or a triisocyanate derived from 3 moles of a diisocyanate, such as toluylenediisocyanate and 4,4'-diisocyanato-diphenylmethane, and 1 mole of a triol, such as glycerol or 1,1,1-trimethylolpropane, especially the reaction product of 3 moles of toluylenediisocyanate and 1 mole of 1,1,1-trimethylolpropane, such polyisocyanates being preferably added to the ready-to-use magnetic dispersion before application to the base. The amount of polyisocyanate added for this purpose is generally about 1 to 15 percent by weight, based on the total amount of binder.

If binders or binder mixtures are used to which, before or during application of the magnetic dispersion to the base, reactive polyisocyanates have been added, there is no need, in contrast to some known polyisocyanate binders, to subject the coated material to a heat treatment after coating, i.e. one which goes beyond normal physical drying, e.g. curing.

The magnetic coatings may be subjected to a conventional surface treatment, e.g. calendering in which the coated material is passed between polished rollers, with the optional application of pressure and optional heating at temperatures of from 50° to 100° C, preferably from 60° to 80° C. Following this treatment the thickness of the magnetic coating is generally from 3 to 20µ and preferably from 8 to 15µ. In the case of the production of flexible magnetic tapes, the coated webs are slit in the longitudinal direction to the usual widths.

As may be seen, e.g., from Tables 1 and 2 which follow and which compare important magnetic, electro-acoustic and mechanical properties of magnetic recording media according to the invention with the corresponding properties of tapes which have been manufactured with prior art polyurethanes or mixtures of prior art polyurethanes with suitable harder surface-coating resin components as the binder, the magnetic recording media of the invention show markedly improved properties, which were not foreseeable. Compared to conventional tapes, magnetic recording media of the invention have a smoother surface and exhibit better tape/head contact. The average peak-to-peak value $R_t$ (determined with a commercial surface-roughness measuring instrument manufactured by Fa. Perthen, Hanover, Germany) shows the coated magnetic recording media of the invention to have a distinct advantage.

The residual magnetization of the tapes according to the invention is appreciably higher than that of conventional tapes, because of the improved orientation of the magnetic particles in the direction of tape travel. The magnetic properties were measured with a vibrating sample magnetometer at a field strength of 160 kA/m.

The tapes of the invention furthermore show improvements in the properties which are of decisive importance for the quality of video recordings, namely in the signal-to-noise ratio, which is a measure of the strength of the video signal, and in the high frequency signal level (5 MHz). These properties were measured on a commercial 1 inch recorder (IVC 821). They were referred to a commercial 1 inch magnetic tape and are comparative values. The life in stop motion of the tape was tested on a 1 inch video recorder (Ampex VR 700); in this test the head rotates against the stationary tape at one point only, and the number of minutes until the signal deteriorates is ascertained. Whilst the tapes of the invention show a life of more than 300 minutes, the comparison tapes, which contain conventional polyurethanes as the binder in the magnetic coating, have a considerably shorter life. Even if harder binder components were admixed to the conventional polyurethanes and this mixture was used as a binder for the magnetic coating, the life in stop motion of the tapes of the invention was not attainable.

The greater hardness (measured in Kg/mm²) of the magnetic coatings of the magnetic recording media according to the invention further reduces the hazard of dust particles adhering to, and being pressed into, the magnetic coating. As a result, the tapes are less prone to drop-outs, i.e. to sudden drops in the signal level, caused by poor dispersion of the magnetic pigment in the coating and by foreign bodies in and on the coating.

When used as audio tapes, the magnetic recording media of the invention again exhibit surprising advantages. The maximum output level at long wavelengths (333 Hz) and short wavelengths (8 kHz) is better than that of similar conventional tapes. The maximum output levels were measured against a reference tape with a magnetic flux of 250 nWb/m at a tape speed of 4.75 cm/sec. Measurement of the test results was carried out with an HF bias current determined according to DIN 45,512.

The parts and percentages in the following Examples and Comparative Experiments are by weight, unless states otherwise. Parts by volume bear the same relation to parts by weight as the liter to the kilogram. The Examples and Comparative Experiments were carried out using both acicular chromium dioxide and gamma-iron(III) oxide as the magnetic pigment.

EXAMPLE 1

7,200 Parts of polytetrahydrofuran (molecular weight 2,000), 3,200 parts of neopentyl glycol, 70 parts of trimethylolpropane, 9,440 parts of diphenylmethane-4,4'-diisocyanate and 4,000 parts of tetrahydrofuran are introduced into a reaction vessel of about 200 l capacity which can be heated and is equipped with a stirrer and reflux condenser, and are heated to 55° C. A further 4,000 parts of tetrahydrofuran are added in such a way that the viscosity of the reaction solution at no time during the further reaction exceeds about 2,500 cp. After all the tetrahydrofuran has been added, the reaction is stopped by adding 1,000 parts of isopropanol. The K value of the polymer formed is about 62.5, measured in 1% strength solution in tetrahydrofuran.

90,000 parts of steel balls, 15,000 parts of the above 20% strength solution of polyether-urethane in tetrahydrofuran, 13,500 parts of a ferromagnetic chromium dioxide pigment of average particle size 0.5µ and a length to width ratio of from 4:1 to 9:1, 270 parts of zinc oleate, 3,000 parts of tetrahydrofuran and 15,000 parts of dioxane are introduced into a steel ball mill having a capacity of about 100,000 parts by volume, and being operated at about 40 rpm. This mixture is dispersed for 96 hours, after which 270 parts of n-butyl stearate and 70 parts of stearic acid, dissolved in 1,000 parts by volume of a solvent mixture of equal parts of tetrahydrofuran and dioxane, are stirred in over one hour. The magnetic dispersion is then filtered under pressure through a filter having a pore width of 5µ. A polyethylene terephthalate film is coated with the magnetic dispersion in a conventional manner using a knife coater, and, after the coated web has been passed through a magnetic orienting field, the coating is dried at from 60° to 100° C, giving a magnetic coating 6µ thick. The coated web is calendered by passing it between heated rollers (80° C) at a nip pressure of about 200 kg/cm, and then slit into tapes of conventional width, e.g. 6.25 and 3.81 mm in the case of audio tapes, and ½ inch, 1 inch and 2 inches in the case of video tapes. The magnetic coatings obtained have very good mechanical properties and are equally suitable for audio and video use. The magnetic properties, etc. of the magnetic tapes and the test results obtained therewith are given in Table 1.

EXAMPLE 2

6,480 Parts of polycaprolactone of molecular weight 830, 3,130 parts of neopentyl glycol, 10,280 parts of diphenylmethane-4,4'-diisocyanate, 110 parts of trimethylolpropane and 40,000 parts of tetrahydrofuran are introduced into a reaction vessel of capacity about 200,000 parts by volume which can be heated and is equipped with a stirrer and reflux condenser, and are heated to 60° C. A further 40,000 parts of tetrahydrofuran are added in such a way that the viscosity of the reaction solution does not exceed about 4,000 cp in the course of the subsequent reaction. The K value of the polymer obtained is about 61, measured in 1% strength solution in tetrahydrofuran.

90,000 parts of steel balls, 15,000 parts of the above 20% strength solution of polycaprolactone-urethane in tetrahydrofuran, 13,500 parts of a ferromagnetic chromium dioxide pigment of average particle size about 0.5µ and a length to width ratio of from 4:1 to 9:1, 270 parts of zinc oleate, 3,000 parts of tetrahydrofuran and 15,000 parts of dioxane are introduced into a steel ball mill having a capacity of 100,000 parts by volume and being operated at about 40 rpm. The further processing of the mixture is as in Example 1. The magnetic recording media obtained have very good magnetic and mechanical properties and are equally suitable for use as audio tapes and video tapes. The magnetic properties, etc. of the magnetic tapes and the test results obtained therewith are given in Table 1.

COMPARATIVE EXPERIMENT A

The procedure followed is as in Example 1, except that in place of the polyether-urethane, produced in solution, which is used in Example 1, 15,000 parts of a 20% strength solution, in tetrahydrofuran, of a commercial polyester-urethane manufactured by Goodrich (Estane 5707) and produced by the melt condensation process, are used. The magnetic properties, etc. of the magnetic recording media and the test results obtained therewith are given in Table 1.

COMPARATIVE EXPERIMENT B

The procedure followed is as in Example 1, except that in place of the polyether-urethane, produced in solution, which is used in Example 1, 15,000 parts of a 20% strength solution, in tetrahydrofuran, of a commercial polyether-urethane manufactured by Goodrich (Estane 5714) and produced by the melt condensation process, are used. The magnetic properties, etc. of the magnetic recording media and the test results obtained therewith are given in Table 1.

COMPARATIVE EXPERIMENT C

The procedure followed is as in Example 1, but in place of the polyether-urethane, produced in solution, which is used in Example 1, a solution of 2,100 parts of a commercial polyester-urethane manufactured by Goodrich (Estane 5707) and 900 parts of a phenoxy resin in 30,000 parts of a solvent mixture consisting of equal parts of tetrahydrofuran and dioxane is employed. No further solvent is added. The magnetic properties, etc. of the magnetic recording media and the test results obtained therewith are given in Table 1.

COMPARATIVE EXPERIMENT D

The procedure followed is as in Example 1, but in place of the polyether-urethane, produced in solution, which is used in Example 1, a solution of 2,100 parts of a commercial polyether-urethane manufactured by Goodrich (Estane 5714) and 900 parts of a phenoxy resin in 30,000 parts of a solvent mixture consisting of equal parts of tetrahydrofuran and dioxane is employed. No further solvent is added. The magnetic properties, etc. of the magnetic recording media and the test results obtained therewith are given in Table 1.

drofuran has been added, the reaction is stopped by adding 1,000 parts of isopropanol. The polyester-urethane produced in this way has a K value of about 61, measured in 1% strength solution in tetrahydrofuran.

40,000 parts of steel balls, 3,300 parts of a 20% strength solution of the polyester-urethane in tetrahydrofuran, 5,000 parts of particulate ferromagnetic iron (III) oxide, the particles being from 0.5 to 1.0μ in length and from 0.05 to 0.2μ in width, 380 parts of conductive carbon, 27 parts of stearic acid, 108 parts of isopropyl myristate, 5,300 parts of dioxane and 1,200 parts of tetrahydrofuran are introduced into a steel ball mill having a capacity of 40,000 parts by volume and being operated at about 40 rpm. The mixture is dispersed for 70 hours. 274 parts of a 20% strength solution of the polyester-urethane in tetrahydrofuran and 740 parts of dioxane are then added to the dispersion. The total mixture is dispersed for a further 20 hours and is then filtered under pressure through a filter having a pore width of 5μ. Further processing is carried out as in Example 1. The magnetic recording media obtained have very good mechanical and magnetic properties, as can be seen from Table 2.

TABLE 1

Magnetic and physical properties of the magnetic tapes manufactured according to Examples 1 and 2 and Comparative Experiments A - D and the test results obtained therewith

| Experiment | Average peak-to-peak value $R_r$ | Magnetic properties HC (kA/M) | $4\pi I_R$ (mT) | Rf | Micro-hardness (kg/mm²) | Tape Life (mins.) | Video Properties HF signal level (db) | Signal-to-Noise ratio (db) | Audio properties $A_H$ (db) | $A_T$ (db) |
|---|---|---|---|---|---|---|---|---|---|---|
| Example 1 | 0.04 | 38.6 | 162 | 3.05 | 14.1 | 300 | +1.6 | +3.0 | −4.8 | +5.8 |
| Example 2 | 0.05 | 38.8 | 159 | 2.92 | 12.7 | 300 | +1.6 | +2.9 | −5.0 | +5.8 |
| Comparative experiment A | 0.08 | 38.4 | 143 | 2.35 | 4.9 | 20 | +1.2 | +1.5 | −6.6 | +3.8 |
| Comparative experiment B | 0.06 | 38.6 | 150 | 2.46 | 2.2 | 2 | +1.5 | +2.4 | −6.0 | +4.2 |
| Comparative experiment C | 0.10 | 38.4 | 142 | 2.20 | 9.6 | 45 | +1.0 | +1.0 | −7.5 | +4.0 |
| Comparative experiment D | 0.10 | 38.4 | 147 | 2.30 | 5.0 | 65 | +1.1 | +1.0 | −7.0 | +4.2 |

Footnotes to Table 1:
Hc : coercive force
$4\pi I_R$ : residual induction
Rf : orientation ratio (ratio of the residual induction in the direction of tape travel to the residual induction in the crosswise direction)
$A_H$ : maximum output level at short wavelengths (recording frequency 8 kHz)
$A_T$ : output level at long wavelengths (recording frequency 333 Hz) at a third harmonic distortion $k_3$ of 5%
$H_F$ : high frequency signal level, measured on IVC 821 against Memorex Chroma 90
Signal-to-noise ratio, measured on IVC 821 against Memorex
$A_H$ and $A_T$ were measured against a reference tape with a magnetic flux of 250 nWb/m.

EXAMPLE 3

8,820 Parts of diethylene glycol adipate of molecular weight 2,800, 2,880 parts of neopentyl glycol, 60 parts of trimethylolpropane, 8,240 parts of diphenylmethane-4,4'-diisocyanate and 40,000 parts of tetrahydrofuran are introduced into a vessel having a capacity of about 200,000 parts by volume which can be heated and is equipped with a stirrer and reflux condenser, and are heated to 55° C. A further 40,000 parts of tetrahydrofuran are added in such a way that the viscosity of the reaction solution does not exceed about 1,300 cp in the course of the subsequent reaction. After all the tetrahy-

EXAMPLE 4

40,000 Parts of steel balls, 5,000 parts of particulate ferromagnetic iron (III) oxide, the particles being from 0.5 to 1.0μ in length and from 0.5 to 0.2μ in width, 380 parts of conductive carbon, 27 parts of stearic acid, 108 parts of isopropyl myristate, 2,300 parts of a 20% strength solution of the polyester-urethane described in Example 3 in tetrahydrofuran, 1,000 parts of a 20% strength solution of a phenoxy resin of molecular weight from about 20,000 to 30,000, manufactured from bisphenol A and epichlorohydrin, 5,300 parts of dioxane and 1,200 parts of tetrahydrofuran are introduced into a steel ball mill having a capacity of 40,000 parts by volume and being operated at about 40 rpm. The mixture is dispersed for 70 hours. 2,000 parts of a 20% strength solution of the polyester-urethane specified in Example 3, in tetrahydrofuran, 750 parts of a 20% strength solution of the said phenoxy resin and 740 parts of dioxane are then added to the dispersion. The total mixture is dispersed for a further 20 hours and is then filtered under pressure through a filter having a pore width of 5μ. Further processing is carried out as in Example 1. The magnetic properties, etc. of the magnetic recording media and the best results obtained therewith are given in Table 2.

COMPARATIVE EXPERIMENT E

The procedure followed is as in Example 3, except that in place of the polyester-urethane, produced in solution, which is used in Example 3, the same amout of a 20% strength solution, in tetrahydrofuran, of a commercial polyester-urethane manufactured by Goodrich (Estane 5707) and produced by the melt condensation process, is used. The magnetic properties, etc. of the magnetic recording media and the test results obtained therewith are given in Table 2.

COMPARATIVE EXPERIMENT F

The procedure followed is as in Example 4, except that in place of the polyester-urethane, produced in solution, which is used in Example 4, the same amount of a 20% strength solution, in tetrahydrofuran, of a commercial polyester-urethane manufactured by Goodrich (Estane 5707) and produced by the melt condensation process, is used. The magnetic properties, etc. of the magnetic recording media and the test results obtained therewith are given in Table 2.

ing polyether is formed by polymerization of cyclic ethers or by reaction of one or more alkylene oxides of 2 to 4 carbon atoms in the alkylene oxide radical with a starter molecule which contains two active hydrogen atoms, in the presence as a chain extender of (B) from 3.5 to 15 moles of a branched-chain aliphatic diol containing from 4 to 10 carbon atoms or a mixture of aliphatic diols containing from 2 to 10 carbon atoms, of which diol mixture at least 50 mole percent is branched-chain and contains from 4 to 10 carbon atoms and (C) from 0 to 1 mole, but not more than 15 mole percent on the basis of the aforesaid aliphatic diol(s) of an aliphatic polyol containing from 3 to 6 hydroxy groups and from 3 to 18 carbon atoms, which (D) from 4.5 to 18 moles of an aromatic diisocyanate containing from 6 to 30 carbon atoms, the amount of isocyanate groups present in the reaction being approximately equivalent to the amount of hydroxy groups in the components A to C.

2. A magnetic recording medium as claimed in claim 1, wherein the chain extender comprises a diol of the general formula

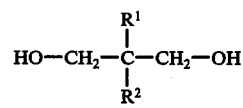

wherein $R^1$ is alkyl of 1 to 4 carbon atoms and $R^2$ is hydrogen or alkyl of 1 to 4 carbon atoms.

3. A magnetic recording medium as claimed in claim 1, wherein the reaction to produce the polyurethane has been carried out in an organic solvent which does not react with the diisocyanate under the reaction conditions.

TABLE 2

Magnetic and physical properties of the magnetic tapes manufactured according to Examples 3 and 4 and Comparative Experiments E and F and the test results obtained therewith

| Experiment | Average peak-to-peak value $R_v$ | Magnetic properties Rf | Magnetic properties $4\pi I_R$ (mT) | Micro-hardness (kg/mm$^2$) | Tape life (mins.) | Signal-to-noise ratio (d/b) | HF signal level (d/b) |
|---|---|---|---|---|---|---|---|
| Example 3 | 0.05 | 1.7 | 110 | 13.7 | 120 | +0.5 | +2 |
| Example 4 | 0.07 | 1.6 | 104 | 11.6 | 180 | +0.5 | +1.8 |
| Comparative Experiment E | 0.08 | 1.5 | 98 | 6.5 | 25 | 0 | +1.1 |
| Comparative Experiment F | 0.10 | 1.4 | 94 | 3.9 | 55 | 0 | +0.6 |

The signal-to-noise ratio and the high frequency signal level were determined on half-inch tapes using a commercial Shibaden SH 700 video recorder. The life was measured on a commercial Sony recorder.

We claim:
1. A magnetic recording medium comprising a non-magnetic base and, applied thereto, a firmly adhering magnetic coating consisting essentially of a dispersion of a magnetic pigment in a binder which contains at least 50 percent by weight of a thermoplastic polyurethane which is soluble in tetrahydrofuran, is free from isocyanate groups, has high surface hardness and a high modulus of elasticity and which has been made by reaction of (A) 1 mole of one or more hydroxyl-containing polyesters and/or one or more hydroxyl-containing polyethers having a molecular weight of from 600 to 4,000, wherein said hydroxyl-containing polyester is formed by esterification of aliphatic dicarboxylic acids of 4 to 12 carbon atoms, carboxylic acid esters of 1 to 4 carbon atoms in the alcohol radical, carboxylic acid anhydrides or carboxylic acid chlorides with aliphatic glycols of 2 to 12 carbon atoms which may contain ether groups, or by polymerization of cyclic lactones of 3 to 6 carbon atoms and wherein said hydroxyl-contain-

4. A magnetic recording medium as claimed in claim 1, wherein the polyurethanes have a softening point greater than 100° C and have a hardness, measured according to DIN 53,157, of from 70 to 160.

5. A magnetic recording medium as claimed in claim 1, wherein the binder consists solely of the polyurethanes.

6. A magnetic recording medium as set forth in claim 1 wherein said hydroxyl-containing polyester is predominantly linear, contains 2 terminal OH groups and has an acid number of less than 10.

7. A magnetic recording medium as set forth in claim 1 wherein said hydroxyl-containing polyether is predominantly linear, contains terminal OH groups.

8. A magnetic recording medium as set forth in claim 1 wherein is a polyester formed by the esterification of an aliphatic dicarboxylic acids selected from the group of glutaric acid, pimelic acid, suberic acid, sebacic acid, dodecanedioic acid and, preferably, adipic acid and succinic acid or mixtures thereof or their corresponding as carboxylic acids esters of 1 to 4 carbon atoms in the alcohol radical, carboxylic acid anhydrides or carboxylic acid chlorides with a glycol selected from the group of diethylene glycol, pentanediol, decanediol and 2,2,4-trimethyl-1,5-pentanediol, 1,4-butanediol, 1,6-hexanediol and 2,2-dimethyl-1,3-propanediol.

9. A magnetic recording medium as set forth in claim 8 wherein said non-magnetic base is selected from the group consisting of linear polyester film, aluminum or aluminum alloy discs and paper.

10. A magnetic recording as set forth in claim 9 wherein said magnetic pigment is selected from the group consisting of acicular chromium dioxide and gamma-iron(III) oxide.

* * * * *

UNITED STATES PATENT AND TRADEMARK OFFICE
CERTIFICATE OF CORRECTION

PATENT NO. : 4,058,646
DATED : November 15, 1977
INVENTOR(S) : Guenter Vaeth et al It is certified that error appears in the above-identified patent and that said Letters Patent are hereby corrected as shown below:

Column 14, line 14, "which" should read --with--

Column 14, line 65, after "wherein" insert --(A)--

Column 15, line 2, delete "as"

Column 16, line 4, after "recording" insert --medium--

Signed and Sealed this

Twenty-second Day of August 1978

[SEAL]

Attest:

RUTH C. MASON
Attesting Officer

DONALD W. BANNER
Commissioner of Patents and Trademarks